(12) United States Patent
Skweres et al.

(10) Patent No.: US 11,136,015 B2
(45) Date of Patent: Oct. 5, 2021

(54) BRAKE SYSTEM AND BRAKE CONTROL VALVE

(71) Applicant: Westinghouse Air Brake Technologies Corporation, Wilmerding, PA (US)

(72) Inventors: Jeffrey B. Skweres, McKeesport, PA (US); Michael S. Plechey, Jeannette, PA (US)

(73) Assignee: WESTINGHOUSE AIR BRAKE TECHNOLOGIES CORPORATION, Wilmerding, PA (US)

(*) Notice: Subject to any disclaimer, the term of this patent is extended or adjusted under 35 U.S.C. 154(b) by 0 days.

(21) Appl. No.: 16/719,624

(22) Filed: Dec. 18, 2019

(65) Prior Publication Data

US 2020/0122702 A1  Apr. 23, 2020

Related U.S. Application Data

(63) Continuation-in-part of application No. 15/691,183, filed on Aug. 30, 2017, now Pat. No. 10,543,827.

(51) Int. Cl.
*B60T 13/14* (2006.01)
*F16K 27/00* (2006.01)
*B60T 8/18* (2006.01)

(52) U.S. Cl.
CPC .......... *B60T 13/141* (2013.01); *B60T 8/1893* (2013.01); *F16K 27/003* (2013.01); *B60T 2270/88* (2013.01)

(58) Field of Classification Search
CPC ........ B60T 15/021; B60T 15/36; B60T 15/42; B60T 15/184; B60T 15/302; B60T 17/04;
(Continued)

(56) References Cited

U.S. PATENT DOCUMENTS 1,632,756 A * 6/1927 Campbell ............. B60T 15/306
 303/38
4,033,632 A * 7/1977 Wilson .................... B60T 15/18
 303/74
(Continued)

FOREIGN PATENT DOCUMENTS

RU  2624146 C2  6/2017

OTHER PUBLICATIONS

Office Action issued for related Russian Patent Application No. 2018109086 dated Jun. 15, 2021 (11 pages).
(Continued)

*Primary Examiner* — Robert A. Siconolfi
*Assistant Examiner* — San M Aung
(74) *Attorney, Agent, or Firm* — The Small Patent Law Group LLC; John P. Darling

(57) ABSTRACT

A distributor valve for a brake control system of a vehicle is provided with an access interface that includes a plurality of access ports for measuring the operational pressures of the distributor valve. The distributor valve includes a pipe bracket and a main line and main portions mounted on the pipe bracket. The pipe bracket includes a plurality of passages for communicating the main portion and the main line portion with each other and with a brake pipe, brake cylinder, and reservoir of the brake control system. The plurality of access ports of the access interface includes ports in communication with the working chamber passage, valve chamber passage, brake pipe passage, reservoir passage, and the brake cylinder passage of the pipe bracket.

18 Claims, 11 Drawing Sheets

(58) Field of Classification Search
CPC ............ B60T 17/228; B60T 2270/406; B60T 8/1893; B60T 13/141; B60T 13/665; B61H 9/00; F16K 27/003; F16K 27/0263
USPC .......................................................... 303/28
See application file for complete search history.

(56) References Cited

U.S. PATENT DOCUMENTS

| | | | | |
|---|---|---|---|---|
| 4,063,784 | A * | 12/1977 | Pick | B60T 15/42 |
| | | | | 303/69 |
| 5,451,099 | A * | 9/1995 | Hart | B60T 15/42 |
| | | | | 303/33 |
| 5,480,218 | A * | 1/1996 | Hart | B60T 17/043 |
| | | | | 303/28 |
| 5,709,436 | A * | 1/1998 | Scott | B60T 17/228 |
| | | | | 303/86 |
| 6,186,600 | B1 * | 2/2001 | Scott | B60T 15/184 |
| | | | | 137/884 |
| 9,901,324 | B2 * | 2/2018 | Cho | A61B 8/5207 |
| 2011/0232370 | A1 * | 9/2011 | Sauter | B60T 17/04 |
| | | | | 73/39 |
| 2015/0057849 | A1 | 2/2015 | Mayer | |

OTHER PUBLICATIONS

English Translation of Office Action issued for related Russian Patent Application No. 2018109086 dated Jun. 15, 2021 (11 pages).
Search Report issued for related Russian Patent Application No. 2018109086 dated May 31, 2021 (2 pages).

* cited by examiner

BRAKE SYSTEM AND BRAKE CONTROL VALVE

CROSS-REFERENCE TO RELATED APPLICATIONS

This application is a continuation-in-part of U.S. patent application Ser. No. 15/691,183, which was filed on 30 Aug. 2017, now U.S. Pat. No. 10,543,827, and the entire disclosure of which is incorporated herein by reference.

BACKGROUND

Technical Field

The subject matter described herein relates to a brake control system and a distributor valve for the brake control system.

Description of Related Art

Railway vehicles may utilize brake control systems incorporating a distributor valve having a pipe bracket (or chamber), a main portion, and a main line portion. The brake control system utilizes different operating pressures for proper operation of the entire distributor valve unit. These five operating pressures can include working chamber, valve chamber, brake pipe, reservoir, and brake cylinder. Currently, there are mainly three models of distributor valves in use in brake control systems of some freight railway vehicles: the 483A-03, the 483A-05, and the KAB60-01.

Some standards for testing the efficacy of the brake control system and the distributor valve only require that a manual single car test be performed on a freight car when a new OEM distributor valve is mounted to a freight car or when the complete distributor valve unit is replaced with a complete re-conditioned valve unit. The testing is performed using a manually controlled testing device that only accesses the brake pipe pressure and manually monitors both the brake pipe and brake cylinder pressures with analog gauges to check for proper operation of the distributor valve. The distributor valve is not provided with any means or mechanism for accessing all five of the operational pressures of the distributor valve while the distributor valve is in use. Testing cannot be performed automatically and cannot be performed during the service life of the distributor valve. The inability to provide a single car test of the distributor valve during its service life significantly increases the risk of improper distributor valve functionality going unnoticed while the distributor valve is in use.

In the United States, solutions exist for accessing the operational pressures of the control valve for a brake control system of a railway freight vehicle. For instance, U.S. Pat. No. 5,480,218 to Hart et al. describes a control valve, such as the AB, ABDW, DB-60, or ABDX models, having an integrally formed access plate on the pipe bracket portion for accessing the operational pressures of the control valve: brake pipe, brake cylinder, emergency reservoir, auxiliary reservoir, and optionally, the quick action chamber. A testing device for automatically and regularly testing the operational pressures of the control valve is also described.

U.S. Pat. No. 5,451,099 to Hart et al. describes a pressure access plate that can be mounted between the pipe bracket portion and the emergency portion or the service portion of the control valve for a brake control system of a railway freight vehicle. The access plate includes a face having ports in communication with integrally formed segregated chambers that communicate the passages of the pipe bracket portion with corresponding passages of the emergency portion or the service portion. The access plate allows for access to the operation pressures of the control valve: brake pipe, brake cylinder, emergency reservoir, auxiliary reservoir, and optionally, the quick action chamber. The access plate allows for existing control valves, such as the ABD, ABDW, DB-60, and the ABDX models, to be retrofitted to provide the capability of regular and automatic testing. A testing device for automatically and regularly testing the operation pressures of the above-mentioned control valves is also described.

BRIEF SUMMARY

One embodiment of the inventive subject matter relates to a distributor valve having an access interface for accessing the operation pressures of the distributor valve to perform automated testing diagnostics on the distributor valve. A replacement pipe bracket for a distributor valve or a pressure access plate can provide direct access to different operational pressures used in the distributor valves of brake control systems. The provided distributor valve or pressure access plate provides a means for easy access, monitoring, and manipulation of the functioning of the distributor valve to allow for regular testing of the distributor valve during its service life using an automated testing device. The pipe bracket of the distributor valve is provided with an integral access plate for accessing the five required operating pressures.

In accordance with one example, a distributor valve for a brake control system of a railway vehicle is provided. The distributor valve is connected to a brake pipe, a brake cylinder, and a reservoir of the brake control system. The distributor valve includes a pipe bracket, a main portion mounted on the pipe bracket, and a main line portion mounted on the pipe bracket. The pipe bracket includes a plurality of passages defined therein and extending through the pipe bracket, the plurality of passages being configured to place the main portion and the main line portion in communication with each other and with the brake pipe, the brake cylinder, and the reservoir. The plurality of passages includes a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other. The pipe bracket further includes an access interface including a plurality of access ports, the plurality of access ports including an access port connected to the working chamber passage, an access port connected to the valve chamber passage, an access port connected to the brake pipe passage, an access port connected to the reservoir passage, and an access port connected to the brake cylinder passage.

According to another example of the present disclosure, a pipe bracket for a distributor valve in a railway vehicle brake control system is provided. The pipe bracket is connected to a brake pipe, a brake cylinder, and a reservoir of the brake control system, and wherein the pipe bracket is configured to have a main portion and a main line portion of the distributor valve mounted thereon. The pipe bracket includes: a plurality of passages defined in the pipe bracket and extending through the pipe bracket, the plurality of passages being configured to place the main portion and the main line portion of the distributor valve in communication with each other and with the brake pipe, the brake cylinder, and the reservoir, wherein the plurality of passages includes a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other; and an integral port interface disposed on a side of the pipe bracket, the integral port interface including a plurality of access ports arranged therein. The plurality of access ports includes an access port connected to the working chamber passage, an access port connected to the valve chamber passage, an access port connected to the brake pipe passage, an access port connected to the reservoir passage, and an access port connected to the brake cylinder passage.

According to another example, a pressure access plate configured to provide access to operational pressures in a distributor valve of a railway brake control system is provided. The distributor valve includes a pipe bracket, a main portion mounted on the pipe bracket, and a main line portion mounted on the pipe bracket. The distributor valve is connected to a brake pipe, a brake cylinder, and a reservoir of the brake control system. The pressure access plate is configured to be mounted between the pipe bracket and the main portion of the distributor valve. The pressure access plate includes a face having a plurality of access ports arranged therein; and a body having a plurality of internally segregated chambers defined therein, each of the internally segregated chambers being in communication with a corresponding access port in the face, each of the chambers including at least one opening configured to place the chamber in communication with a corresponding passage of the main portion and at least one opening configured to place the chamber in communication with a corresponding passage of the pipe bracket. The plurality of internally segregated chambers includes a first chamber configured to communicate a working chamber passage in the pipe bracket with a working chamber access port in the face and a first passage in the main portion, a second chamber configured to communicate a valve chamber passage in the pipe bracket with a valve chamber access port in the face and a second passage in the main portion, a third chamber configured to communicate a brake pipe passage in the pipe bracket with a brake pipe access port in the face and a third passage in the main portion, a fourth chamber configured to communicate a reservoir passage in the pipe bracket with a reservoir access port in the face and a fourth passage in the main portion, and a fifth chamber configured to communicate a brake cylinder passage in the pipe bracket with a brake cylinder access port in the face and a fifth passage in the main portion.

According to another example, a method for accessing operational pressures in a distributor valve of a railway brake control system is provided. The distributor valve is connected to a brake pipe, a brake cylinder, and a reservoir of the brake control system. The distributor valve includes a pipe bracket, a main portion mounted on the pipe bracket, and a main line portion mounted on the pipe bracket. The pipe bracket includes a plurality of passages defined therein and extending through the pipe bracket, the plurality of passages being configured to place the main portion and the main line portion in communication with each other and with the brake pipe, the brake cylinder, and the reservoir. The plurality of passages includes a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other. The method includes: providing an access interface including a plurality of access ports on the pipe bracket, the plurality of access ports including an access port connected to the working chamber passage, an access port connected to the valve chamber passage, an access port connected to the brake pipe passage, an access port connected to the reservoir passage, and an access port connected to the brake cylinder passage.

DETAILED DESCRIPTION

Figure 1:
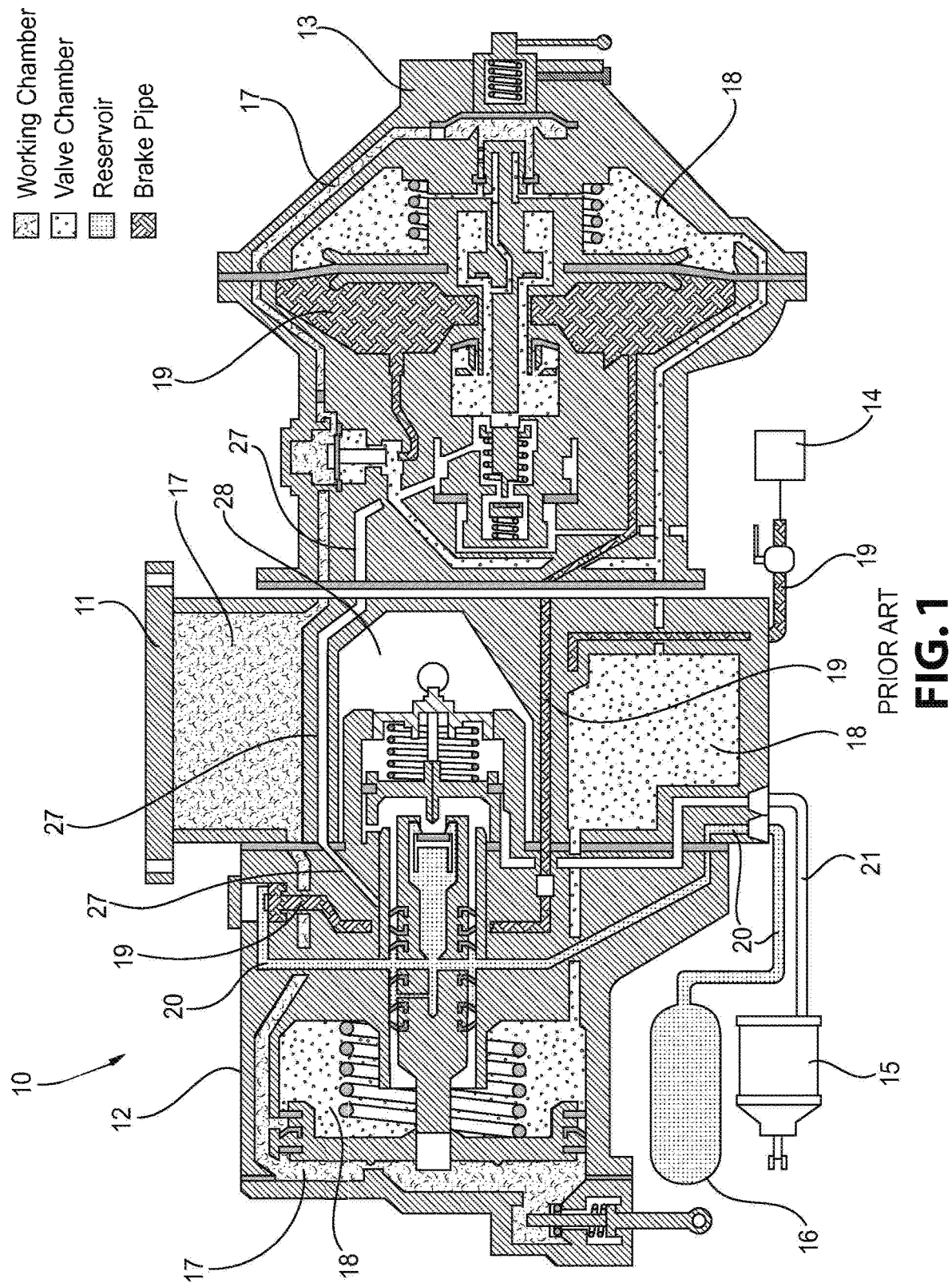
FIG. 1 depicts a diagrammatic view of a current distributor valve.
Figure 2:
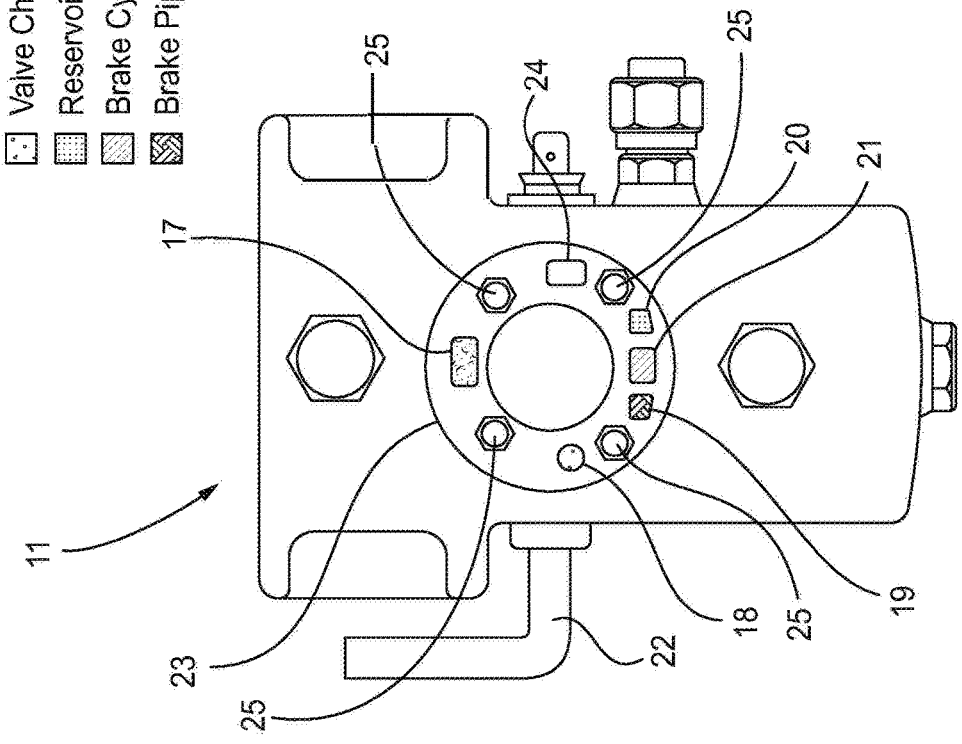
FIG. 2 depicts two side views of a current pipe bracket of the distributor valve shown in FIG. 1.
Figure 2:
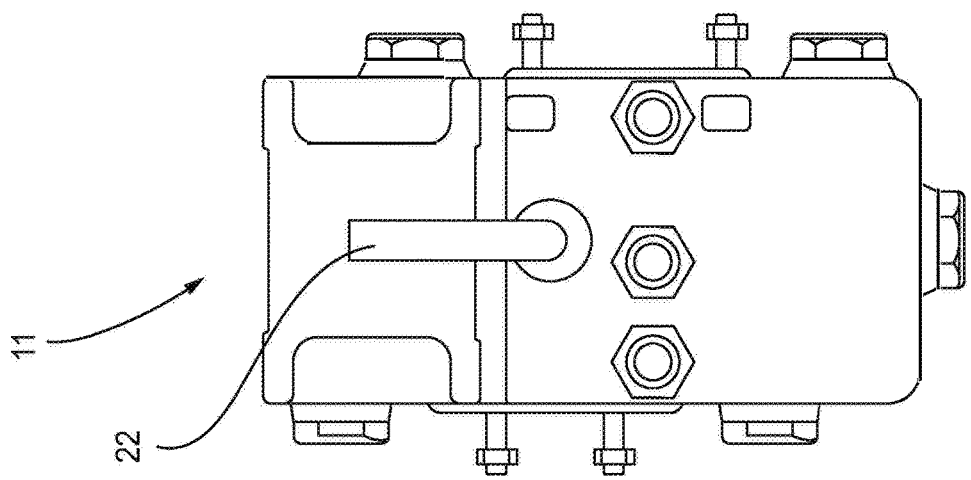

With reference to FIGS. 1 and 2, a distributor valve 10 is shown. The distributor valve 10 includes a pipe bracket (or chamber) 11, a main portion 12, and a main line portion 13. The main portion 12 optionally can be referred to as a valve body. The distributor valve 10 is connected to a brake pipe 14, a brake cylinder 15, and a reservoir 16 of the brake control system and is fluid communication with the brake pipe 14, brake cylinder 15, and the reservoir 16 to control the flow of pressurized air to and from these components to control operations of the brake system. The pipe bracket 11 is the central portion to which the main and main line portions 12, 13 are mounted to create the distributor valve 10. The pipe bracket 11, the main portion 12, and the main line portion 13 include a plurality of passages and chambers, which are hereinafter collectively referred to as "passages" to develop the five different operating pressures required for operation of the distributor valve 10 to ensure proper pneumatic braking of a vehicle, such as a railway freight car. While the description herein relates to rail vehicles, such as trains, locomotives, and rail (or freight) cars, not all embodiments of the inventive subject matter are limited to rail vehicles. One or more embodiments of the inventive subject matter described herein can relate to non-rail vehicles, such as trucks, buses, trailers, semi-trailers, or other vehicles having air brakes.

The distributor valve 10 includes working chamber passages 17 for the working chamber pressure, valve chamber passages 18 for the valve chamber pressure, brake pipe passages 19 for the brake pipe pressure, reservoir passages 20 for the reservoir pressure, and brake cylinder passages 21 for the brake cylinder pressure. The Additional Discharge Channel (ADC) passage 27 is a common integral passage between the main line portion 13, the pipe bracket 11, and the main portion 12 that supplies a small amount of combined brake pipe and valve chamber pressures direct to the brake cylinder passage 21 and a brake cylinder exhaust passage 28 on initial brake applications. As shown in FIG. 1, the passages 17, 18, 19, 20 include different symbols to illustrate the operating pressure developed therein. These same symbols are used to identify the same pressures throughout the drawings. The passages 21 and 27 for developing the brake cylinder pressure are blank because the distributor valve 10 is shown in its release position, in which the brake cylinder operational pressure is not developed.

As shown in FIG. 2, the pipe bracket 11 also includes a freight mode switch 22 that can be manually positioned based on the total gross rail weight of the freight car. This eccentric switch is in contact with specific internal parts of the main portion 12. The position of the freight mode switch (empty, medium, or loaded) will dictate how much brake cylinder pressure will be achieved on that particular freight car during a full service brake application. Before 'empty load' equipment was used on some freight cars, having the ability to manually manipulate how much brake cylinder pressure could be obtained during a service brake application was important to ensure proper handling of the vehicle system.

It should be noted that the distributor valve 10 lacks that ability to produce an emergency brake application, (e.g., the distributor valve 10 cannot locally vent brake pipe air pressure at a rapid rate at each distributor valve location on every freight car in the freight train). Therefore, during an 'emergency' brake application, all of the brake pipe air in the train's entire brake pipe line has to be exhausted out of the locomotive's brake valve handle, and is not rapidly locally vented at each distributor valve's location on each freight car. This arrangement leads to relatively longer times required to stop the train during an emergency brake application as compared to other brake control systems. With respect to the distributor valve 10, there is no increase in final brake cylinder pressure obtained between a full service or emergency brake application.

Brake pipe pressure is supplied to each individual vehicle in a vehicle system or consist (e.g., a train) through an actual hard pipe from another vehicle in the vehicle system (e.g., a locomotive). The compressors on the locomotive charge the main reservoir, from which the brake pipe line through the entire length of the train is charged. Therefore, brake pipe air is supplied to the brake pipe hard pipe from the locomotive through the brake valve that is controlled by the engineer. Brake pipe air then flows down the length of the brake pipe on each freight car to pneumatically charge each freight car's distributor valve unit.

Within the distributor valve main portion, brake pipe pressure charges the reservoir. Within the main line portion, brake pipe pressure charges the valve chamber which then charges the working chamber pressure. The distributor valve pipe bracket internally houses two key reference pressures, working chamber and valve chamber. The pressure differential relationship between these two reference pressures dictate how the distributor valve operates.

The main portion is responsible for providing the following different types of pneumatic functions: Charges the Single Reservoir—allows the brake pipe to charge the single reservoir; Applies Brakes—when the working chamber/valve chamber pressure differential reaches a specific range when brake pipe air is being exhausted at the locomotive brake valve handle, reservoir pressure is dumped into the brake cylinder which moves the brake shoes against the wheels at each car to provide the retardation force locally at each car; Releases Brakes—when the working chamber/valve chamber pressure differential reaches a specific range, brake cylinder pressure is then vented directly to the atmosphere, thus releasing the braking force on each freight car; Limiting Valve Function—provides a specific range of brake cylinder pressure when brake pipe pressure is reduced at its minimum value from its original fully charged system pressure; Direct Action (a.k.a. brake cylinder pressure maintaining)—if a leak is present in the brake cylinder volume/piping on the freight car, reservoir air pressure will maintain the brake cylinder pressure at its previous established level; and Release Valve Function—allows for the ability to manually exhaust working chamber pressure which then allows for the proper release of brake cylinder pressure when the handle is manually manipulated.

The pipe bracket (chamber) freight mode switch handle position (empty, medium, loaded) dictates how much final brake cylinder pressure will be obtained during a service brake application. Lower final brake cylinder pressures will be obtained with the freight mode switch in the 'empty' position. Maximum stopping force will be obtained with the freight mode switch in its 'loaded' position.

The main line portion is responsible for providing the following different types of pneumatic functions: Charging Valve Chamber and Working Chamber—allows brake pipe pressure to charge the valve chamber which then charges working chamber pressure; Additional Discharge of Brake Pipe Pressure—provides a local reduction of brake pipe pressure that helps propagate the braking signal faster through the train, which involves locally venting brake pipe pressure at a slow rate on each distributor valve unit in the train and results in shorter train stop distances; Direct Release of Brake Cylinder Pressure—when this portion's handle is in 'plain' mode (flat terrain mode) and the brakes are released on the freight car after a brake application, brake cylinder pressure fully exhausts down to 0 PSI (e.g., direct release of brakes occurs); Graduated Release of Brake Cylinder Pressure—when this portion's handle is in 'hilly' mode (mountainous terrain), the amount of brake cylinder pressure exhausted on each freight car is limited (e.g., graduated release of BC pressure occurs) with the amount of brake cylinder pressure that is released being solely dependent upon how much brake pipe pressure air is increased by the engineer at the locomotive's brake valve handle; and Over-Charge Dissipation—allows the 'overcharge' of brake pipe pressure to flow back into the valve chamber at a specific rate so that the distributor valve does NOT apply the brakes. In Russia, over-charging the brake pipe line with greater than required system brake pipe pressure is performed to help ensure that the brakes in the rear of the train do indeed 'release'. The 'overcharging' of brake pipe pressure is required because the current Russian distributor valve does NOT have a service accelerated release function or an emergency accelerated release function.

As stated earlier, this distributor valve may not have an 'emergency' portion. Therefore, when an 'emergency' application is made, the final brake cylinder pressure developed is the same regardless of whether brake pipe pressure was reduced to 0 PSI at a 'service' rate of reduction, or very rapidly, at an 'emergency' rate of reduction at the locomotive brake valve handle.

As of today, some current standards only state that a manual single car test must be performed on a freight car only when a new OEM distributor valve is mounted to a freight car or when the complete distributor valve unit is replaced with a complete re-conditioned distributor valve unit. The current single car test procedure utilizes a manually controlled single car test device that only accesses brake pipe pressure and manually monitors both brake pipe and brake cylinder pressures with analog gauges to check for proper operation of the distributor valve unit. Using an automated single car test device that can manipulate all five required pneumatic pressures available in the freight braking system (brake pipe, working chamber, valve chamber, reservoir, brake cylinder) will result in a more efficient and significantly better single car test method for the freight car. Furthermore, an automated single car test device will allow freight cars to be tested while still in 'field service'. An automated, single vehicle test devices can potentially lead to a paradigm shift on how often a vehicle receives a single test to ensure proper functionality of the pneumatic braking system exists which, therefore, will lead to an overall safer operating fleet.

With reference to FIGS. 1 and 2, the pipe bracket 11 of a distributor valve 10 includes an interface 23 for mounting the main portion 12 to the pipe bracket 11 and for establishing a pneumatic interface between the passages of the pipe bracket 11 and the main portion 12. As shown, the interface 23 includes openings or ports for establishing pneumatic connections between the working chamber passages 17, the valve chamber passages 18, the brake pipe passages 19, the reservoir passages 20, the brake cylinder passages 21, and the ADC passage 27 in the pipe bracket 11 and the corresponding passages 17, 18, 19, 20, 21, 27 in the main portion 12. The interface 23 also includes an ADC port 24 for transmitting pressure and/or pneumatic signals between the ADC passages of the pipe bracket 11, the main portion 12, and the main line portion 13 that do not need to be measured or tested as part of the single car diagnostic testing of the distributor valve 10. The interface 23 also includes a plurality of mounting holes 25 that receive fasteners connecting the main portion 12 to the pipe bracket 11.

The interfaces for distributor valve pipe brackets may contain air passageways located in the same specific area on each type of pipe bracket. This is specifically done for interchangeability of the main portion. The main portion side of the pipe bracket contains access to all five working pressures (working chamber, valve chamber, brake pipe, brake cylinder, and reservoir) that would be required to be monitored in order to perform an automated version of the single car test. The main line portion side of the distributor valve may not contain access to all five of these required working pressures.

Figure 3:
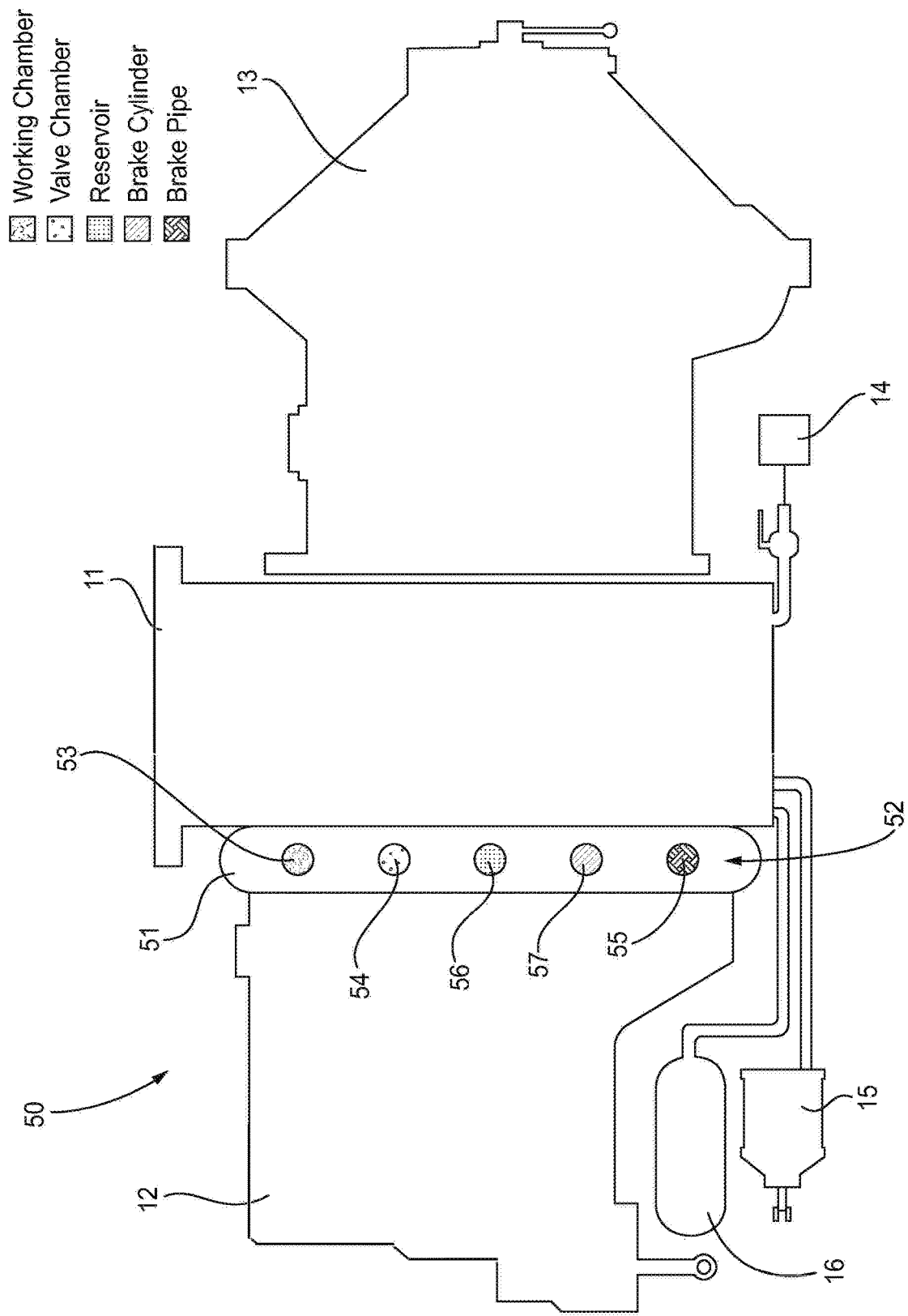
FIG. 3 depicts a distributor valve incorporating a pressure access plate in accordance with an aspect or example of the inventive subject matter.
Figure 4:
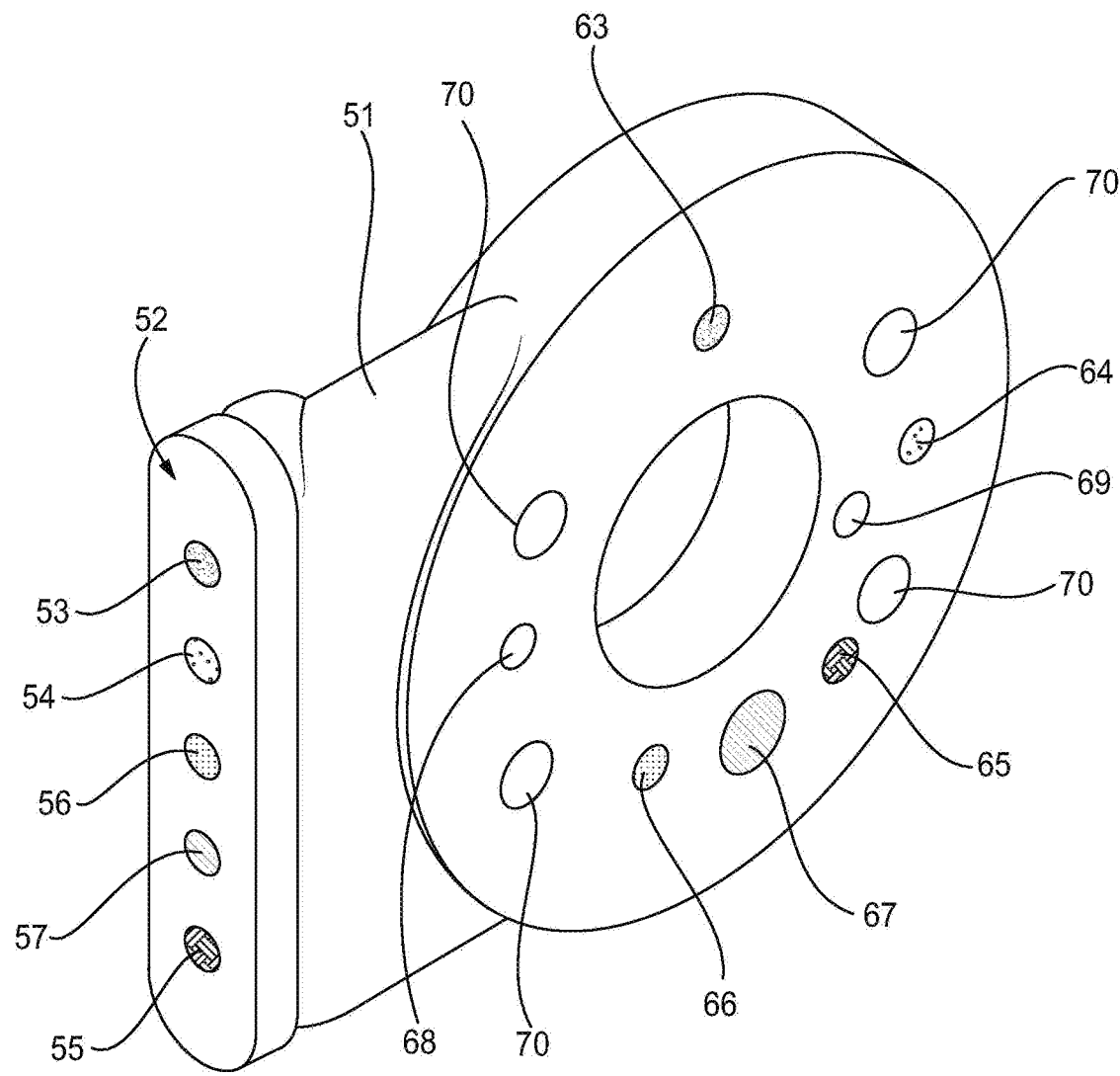
FIG. 4 depicts a perspective view of the pressure access plate of FIG. 3.
Figure 5:
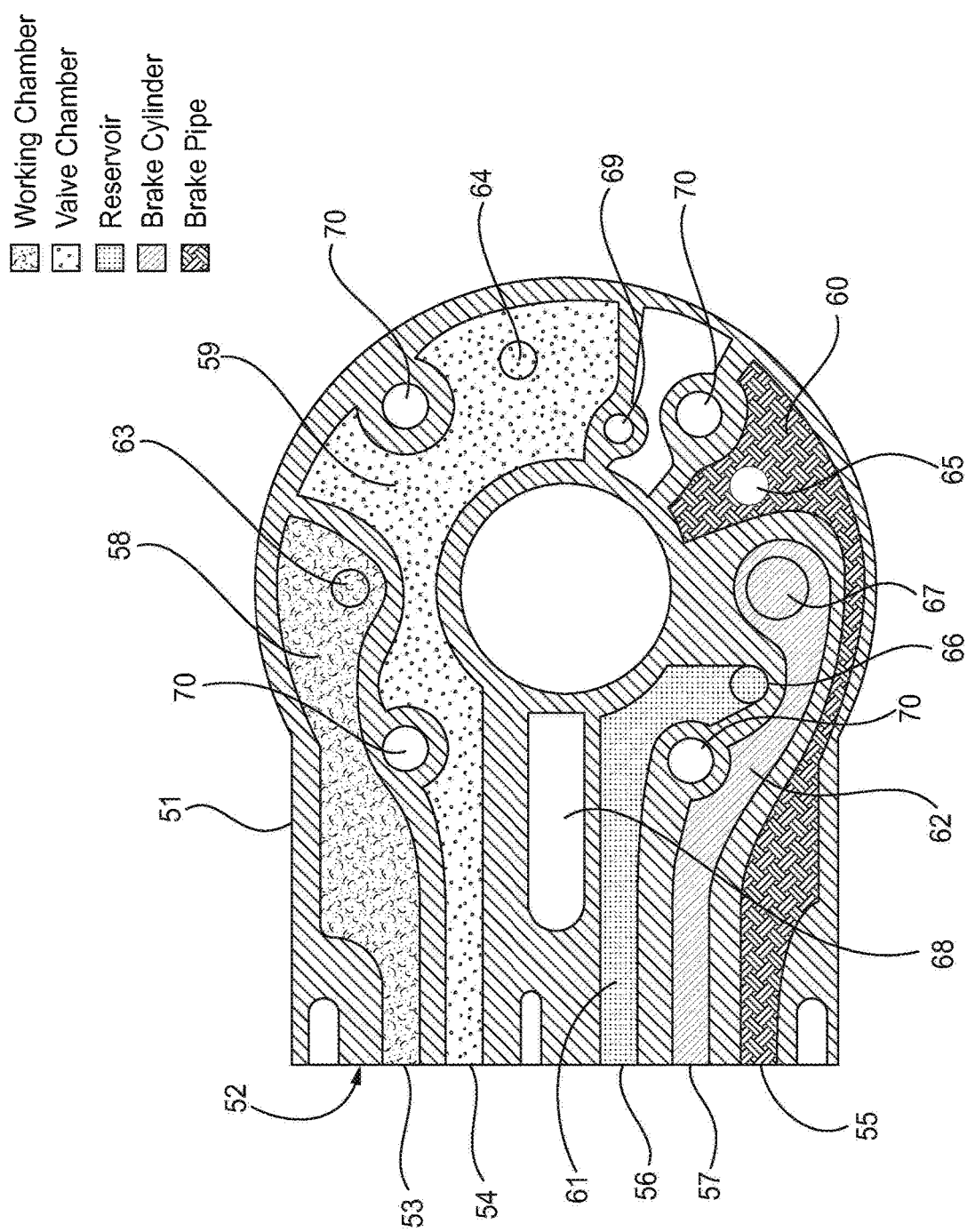
FIG. 5 depicts a cross-sectional view of the pressure access plate of FIG. 3.

With reference to FIGS. 3-5, a distributor valve assembly 50 incorporating an access interface in the form of a pressure access plate 51 is shown in accordance with one example of the inventive subject matter. As shown, the distributor valve 50 is connected to a brake pipe 14, brake cylinder 15, and reservoir 16 of the brake control system. The distributor valve 50 includes the pipe bracket 11, the main portion 12 mounted on the pipe bracket 11, and the main line portion 13 mounted on an opposite side of the pipe bracket 11 from the main portion 12. The pipe bracket 11 includes a plurality of passages 17, 18, 19, 20, 21, 27 defined therein and extending through the pipe bracket 11. The plurality of passages 17, 18, 19, 20, 21, 27 is configured to place the main portion 12 and the main line portion 13 in communication with each other and with the brake pipe 14, the brake cylinder 15, and the reservoir 16, as shown in FIG. 1. In particular, the plurality of passages includes a working chamber passage 17 configured to place the main portion 12 in communication with the main line portion 13, a valve chamber passage 18 configured to place the main portion 12 in communication with the main line portion 13, a brake pipe passage 19 configured to place the main portion 12 and the main line portion 13 in communication with the brake pipe 14, a reservoir passage 20 configured to place the main portion 12 in communication with the reservoir 16, a brake cylinder passage 21 configured to place the main portion 12 and the main line portion 13 in communication with the brake cylinder 15, and the ADC passage 27 configured to place the main portion 12 in communication with the main line portion 13 through the pipe bracket 11.

As shown, the pipe bracket 11 of the distributor valve 50 also includes an access interface in the form of the pressure access plate 51. The pressure access plate 51 is mounted between the main portion 12 and the pipe bracket 11 of the distributor valve 50 and is configured to provide access to the five operational pressures of the railway brake control system (working chamber, valve chamber, brake pipe, reservoir, and brake cylinder). The pressure access plate 51 includes a face 52 having a plurality of access ports 53, 54, 55, 56, 57 arranged therein and a body having a plurality of internally segregated chambers 58, 59, 60, 61, 62 defined therein. Each of the internally segregated chambers 58, 59, 60, 61, 62 is in communication with a corresponding one of the access ports 53, 54, 55, 56, 57 in the face 52. Each of the chambers 58, 59, 60, 61, 62 also includes at least one opening 63, 64, 65, 66, 67 configured to place the chamber 58, 59, 60, 61, 62 in communication with a corresponding passage 17, 18, 19, 20, 21 of the pipe bracket 11 and the main portion 12. In particular, each chamber 58, 59, 60, 61, 62 includes openings 63, 64, 65, 66, 67 defined in each opposing side of the pressure access plate 51 and intersecting with the chambers 58, 59, 60, 61, 62 that interface with the corresponding passages 17, 18, 19, 20, 21 of the pipe bracket 11 and the main portion 12. Annular gaskets (not shown) may be provided around each of the openings 63, 64, 65, 66, 67 in the pressure access plate 51. Alternatively, a unitary gasket (not shown) may be provided around several adjacent openings or around all of the openings on both sides of the pressure access plate 51.

The face 52 of the pressure access plate 51 includes an access port 53 connected to the working chamber 17, an access port 54 connected to the valve chamber 18, an access port 55 connected to the brake pipe passages 19, an access port 56 connected to the reservoir passages 20, and an access port 57 connected to the brake cylinder passages 21. The plurality of internally segregated chambers formed in the pressure access plate 52 includes a first chamber 58 configured to communicate with the working chamber 17 in the pipe bracket 11 with the working chamber access port 53 in the face 52 and the working chamber passages 17 in the main portion 12 via openings 63, a second chamber 59 configured to communicate the valve chamber 18 in the pipe bracket 11 with the valve chamber access port 54 in the face 52 and the valve chamber passages 18 in the main portion 12 via openings 64, a third chamber 60 configured to communicate the brake pipe passages 19 in the pipe bracket 11 with the brake pipe access port 55 in the face 52 and the brake pipe passages 19 in the main portion 12 via openings 65, a fourth chamber 61 configured to communicate the reservoir passages 20 in the pipe bracket 11 with the reservoir access port 56 in the face 52 and the reservoir passages 20 in the main portion 12 via openings 66, and a fifth chamber 62 configured to communicate the brake cylinder passages 21 in the pipe bracket 11 with the brake cylinder access port 57 in the face 52 and the brake cylinder passages 21 in the main portion 12 via openings 67.

As shown in FIGS. 4 and 5, the pressure access plate 51 also includes ADC opening 68 and a brake pipe signal opening 69 extending through the body of the pressure access plate 51 without communicating with any of the segregated chambers 58, 59, 60, 61, 62 in order to communicate corresponding pressures in the pipe bracket 11 and the main portion 12 of the distributor valve 50 through the pressure access plate 51. In particular, the ADC passage 27 in the pipe bracket 11 is connected to the corresponding passage in the main portion 12 through the ADC opening 68 in the pressure access plate 51. The ADC opening 68 is not required to be accessible through the face 52 of the pressure access plate 51. The ADC opening 68 and the brake pipe signal opening 69 may also be surrounded with annular gaskets (not shown) to provide a seal between these openings 68, 69 and the corresponding passages in the pipe bracket 11 and the main portion 12. The pressure access plate 51 further includes a plurality of mounting holes 70 extending through the pressure access plate 51 without communicating between any of the segregated chambers 58, 59, 60, 61, 62, to allow mounting studs (not shown) to pass through the plurality of mounting holes 70 so that the pressure access plate 51 can be securely fastened between the pipe bracket 11 and the main portion 12 when mounting stud nuts (not shown) are tightened.

As shown in FIG. 4, the face 52 of the pressure access plate 51 is connected to the body by an angled portion of the body. This angled portion allows the face 52 to be positioned at a selected amount away from the pipe bracket 11 or the main portion 12 when the access plate 51 is mounted between the main portion 12 and the pipe bracket 11.

The pressure access plate 51 may be configured to face in any direction with respect to the main portion 12 and the pipe bracket 11. For instance, the pressure access plate 51 could be configured such that the face 52 is disposed upwardly, downwardly, or rearwardly from the orientation shown in FIG. 3. Further, it is to be appreciated that the pressure access plate 51 may be formed with multiple faces of access ports that are oriented in different directions to facilitate access of the operational pressures of the distributor valve 50 via the pressure access plate 51. The pressure access plate 51 may be formed from any of a variety of materials. For example, the pressure access plate 51 may be formed as an iron casting with the chambers 58, 59, 60, 61, 62 integrally formed in the casting according to known techniques. Alternatively, the pressure access plate 51 may be formed from a different metal, such as steel or aluminum, or from a plastic material. Also, the arrangement of the ports 53, 54, 55, 56, 57 in the face 52 of pressure access plate 51 may be adjusted in a manner that is better suited for the overall design of the casting. Thus, the positions of the ports 53, 54, 55, 56, 57 on the face 52 may be different than illustrated. It is further to be appreciated that the pressure access plate 51 may be structured to be positioned between the main portion 12 and the pipe bracket 11 in distributor valves 10 that are configured to mount the main portion 12 and the main line portion 13 side by side next to each other on one side of the pipe bracket 11.

Figure 11:
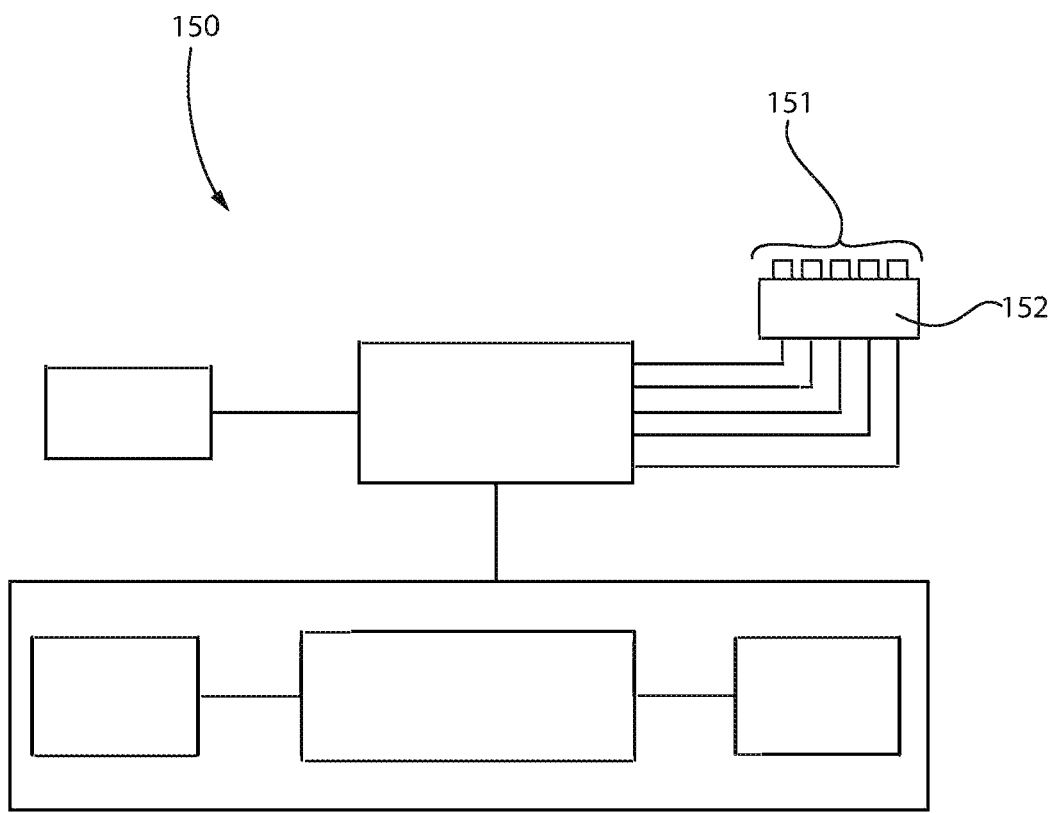
FIG. 11 depicts a schematic view of a testing device for use with the pressure access plate or the integral port interface in accordance with an example of the inventive subject matter.

With reference to FIG. 11, the face 52 of the pressure access plate 51 is configured to be engaged by a testing device 150 that measures the operational pressures of the plurality of passages 17, 18, 19, 20, 21 of the pipe bracket 11 via the access ports 53, 54, 55, 56, 57 defined in the face 52 of the pressure access plate. As discussed above, the testing device 150 may be an automated single car test device that can manipulate all five required pneumatic pressures available in the Russian freight braking system. The testing device 150 includes a fitting 151 and an adapter 152 configured to engage the face 52 of the pressure access plate 51 to place the access ports 53, 54, 55, 56, 57 in pneumatic communication with the sensing apparatus of the testing device 150. The face 52 may include mounting holes 118 defined therein for establishing a connection between the fitting 151 and the face 52. A testing device of this type adapted for testing pressures in an American freight braking system is described in U.S. Pat. Nos. 5,451,099 and 5,480,218. When the operational pressures of the distributor valve 50 are not being tested, a cover plate (not shown) or similar closure may be connected to the face 52 of the pressure access plate 51 to seal the access ports 53, 54, 55, 56, 57 closed.

Figure 6:
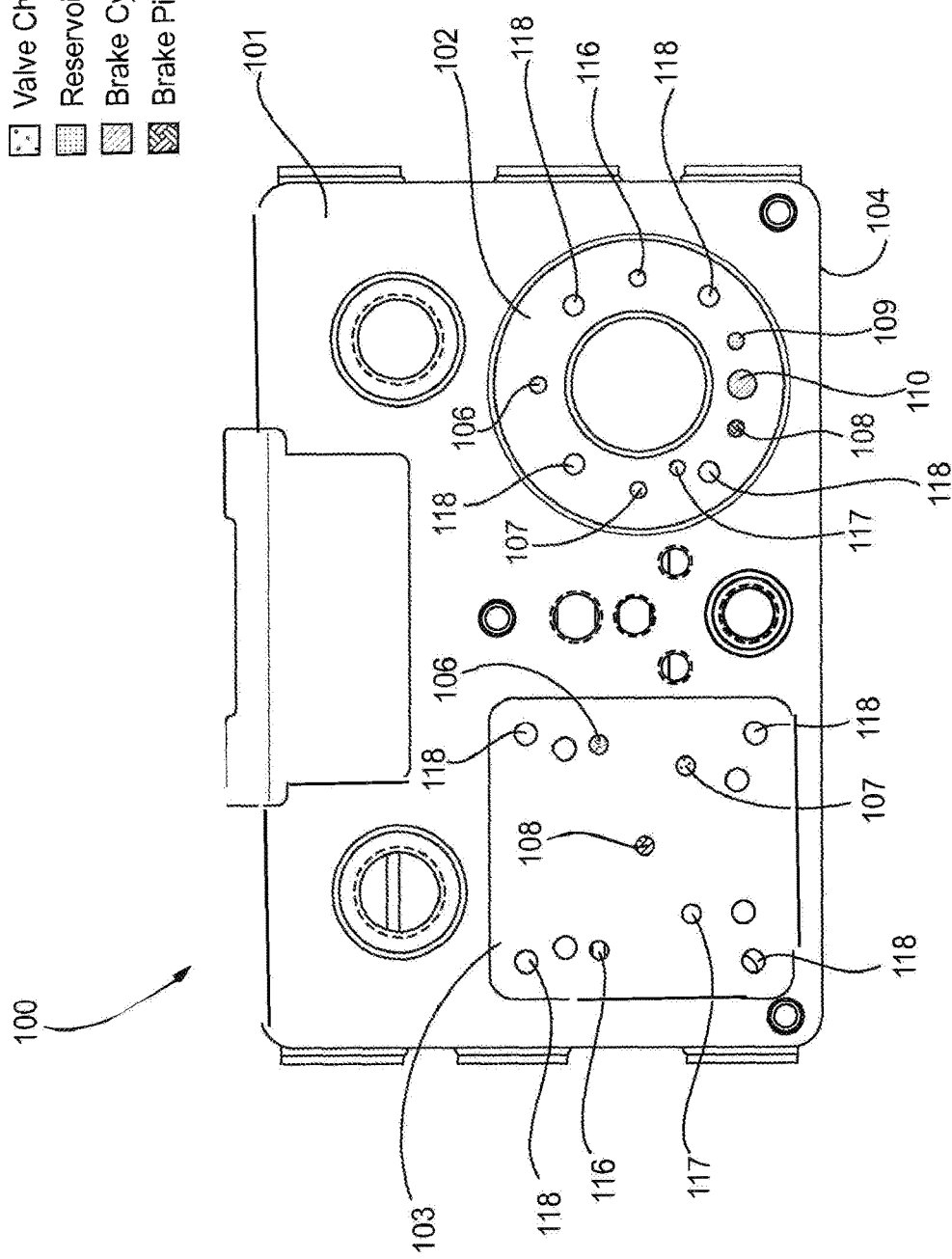
FIG. 6 depicts a front view of a distributor valve pipe bracket having an integral port interface in accordance with an example of the inventive subject matter.

With reference to FIGS. 6-10, a pipe bracket 100 for a distributor valve in a vehicle brake control system incorporating an access interface in the form of an integral port interface 105 is shown in accordance with an example of the inventive subject matter. The pipe bracket 100 can be a replacement for the above-discussed pipe bracket 11 of some brake control systems. As shown in FIG. 6, the pipe bracket 100 is formed as a multi-sided construction having a first or front side 101 and a second or bottom side 104 adjacent to the first or front side 101.

Figure 7:
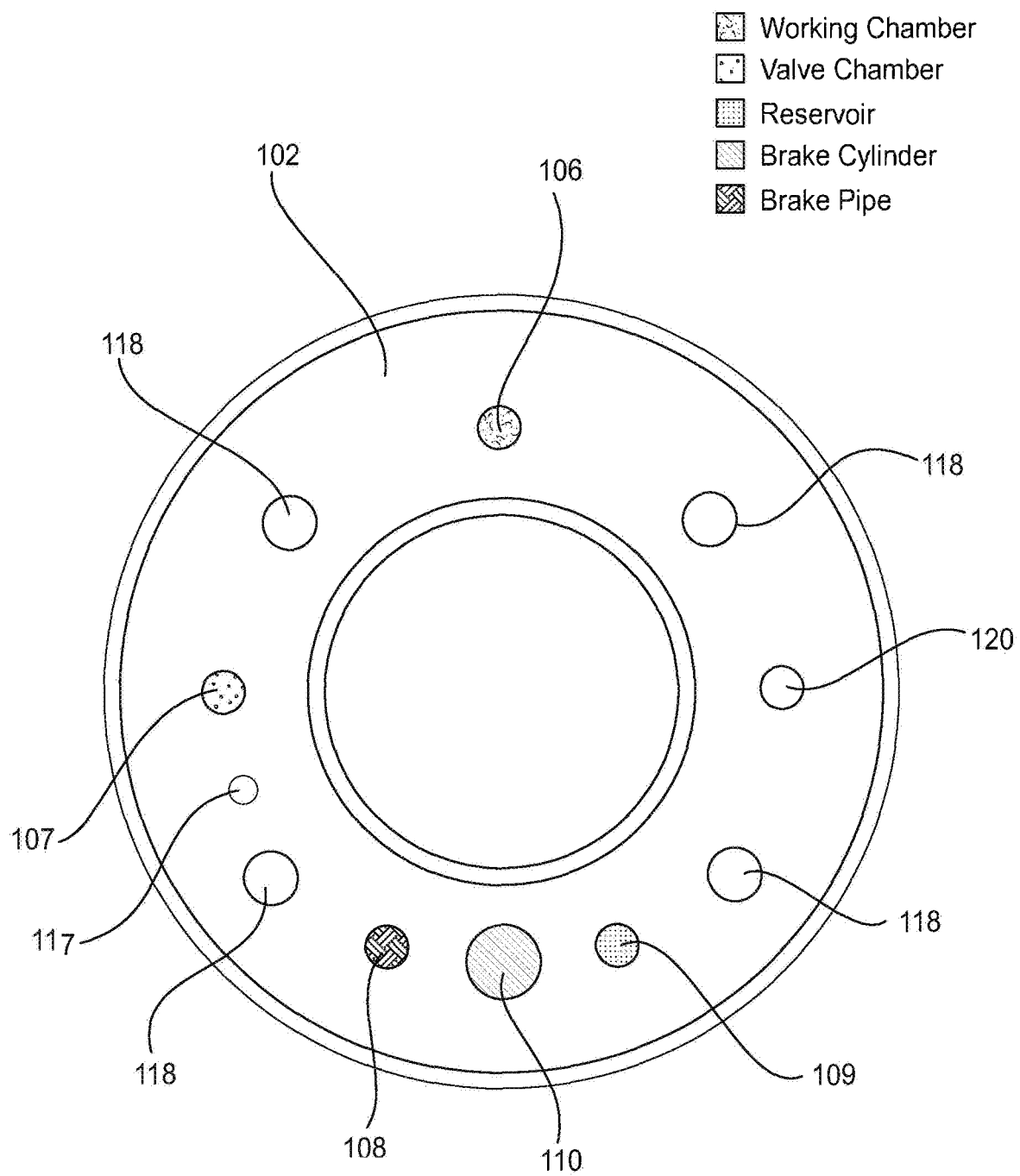
FIG. 7 depicts an enlarged view of an interface on the distributor valve pipe bracket of FIG. 6 for mounting of the main portion of the distributor valve on the pipe bracket in accordance with an example of the inventive subject matter.

As shown in FIGS. 6 and 7, the first side 101 includes an interface 102 for mounting the above-described main portion 12 of the distributor valve on the pipe bracket 100 and another interface 103 for mounting the above-described main line portion 13 of the distributor valve spaced apart on the first side 101 of the pipe bracket 100. Further, the pipe bracket 100 is configured to be connected to the brake pipe 14, the brake cylinder 15, and the reservoir 16 of the brake control system, as discussed above.

As shown in FIGS. 6-10, the pipe bracket 100 has a plurality of passages 106, 107, 108, 109, 110, 117, 120, 121 defined therein and extending through the pipe bracket 100. In FIGS. 6-10, the passages 106, 107, 108, 109, 110, 117, 120, 121 are identified by the openings or sectors of the pipe bracket 100 where the passages 106, 107, 108, 109, 110, 117, 120, 121 may be exposed to or in communication with the exterior of the pipe bracket 100. In particular, the pipe bracket 100 includes a working chamber passage or passages 106, a valve chamber passage or passages 107, a brake pipe passage or passages 108, a reservoir passage or passages 109, and a brake cylinder passage or passages 110. The passages 106, 107, 108, 109, 110 accommodate the same five operational pressures of the distributor valve as the pipe bracket 11 discussed above. In FIGS. 6-10, the operational pressures are also designated with various types of shading or cross-hatching for clarity in understanding the drawings.

As shown in FIGS. 6 and 7, the interfaces 102, 103 on the first side 101 of the pipe bracket 100 include openings for communicating the passages 106, 107, 108, 109, 110, 117, 120 of the pipe bracket 100 in communication with corresponding passages of the main portion 12 and the main line portion 13. As such, the passages 106, 107, 108, 109, 110, 117, 120 place the main portion 12 and the main line portion 13 in communication with each other and with the brake pipe 14, the brake cylinder 15, and the reservoir 16.

As shown in FIG. 7, the interface 102 for mounting and communicating the main portion 12 on the pipe bracket 100 includes a port that accesses the working chamber passages 106 for communicating the working chamber pressure, a port that accesses the valve chamber passages 107 for communicating the valve chamber pressure, a port that accesses the brake pipe passages 108 for communicating the brake pipe pressure, a port that accesses the reservoir passages 109 for communicating the reservoir pressure, and a port that accesses the brake cylinder passages 110 for communicating the brake cylinder pressure. The interface 102 for the main portion 12 may additionally include an opening for the ADC passage 120 for communicating the ADC pressure in the ADC passage 120 between the pipe bracket 100 and the main portion 12. The interface 102 for the main portion 12 may also include an opening for the brake pipe signal passage 117 for communicating the brake pipe signal pressure in the brake pipe signal passage 117 between the pipe bracket 100 and the main portion 12.

The brake pipe signal passage 117 in the pipe bracket 100 provides another brake pipe port passage that, depending upon the handle position of the main line portion 13, will either allow brake pipe air to flow to the main portion 12 to ensure that service accelerated release (SAR) of the brakes can occur or will prevent brake pipe air to flow in a manner that will nullify the SAR function. Some distributor valves are not configured to perform the SAR function. According to one example of the inventive subject matter, the pipe bracket 100, main portion 12, and main line portion 13 may be configured to perform the SAR function, which provides for improvements in handling and braking of the vehicle system. The pressure within the brake pipe signal passage 117 of the pipe bracket 100 and corresponding passages in the main portion 12 and the main line portion 13 does not need to be monitored during single car diagnostic testing of the distributor valve.

As shown in FIG. 6, the interface 103 for the main line portion 13 may include an opening for communicating the ADC pressure in the ADC passage 120 between the pipe bracket 100 and the main line portion 13. Both interfaces 102, 103 include mounting holes 118 for accepting fasteners mounting the main portion 12 and the main line portion 13 of the distributor valve 10 to the pipe bracket 100 at the interfaces 102, 103. According to one alternative example of the present disclosure, the pipe bracket 100 is provided without the brake pipe signal passage 117 and the corresponding opening in the interface 102.

Figure 9:
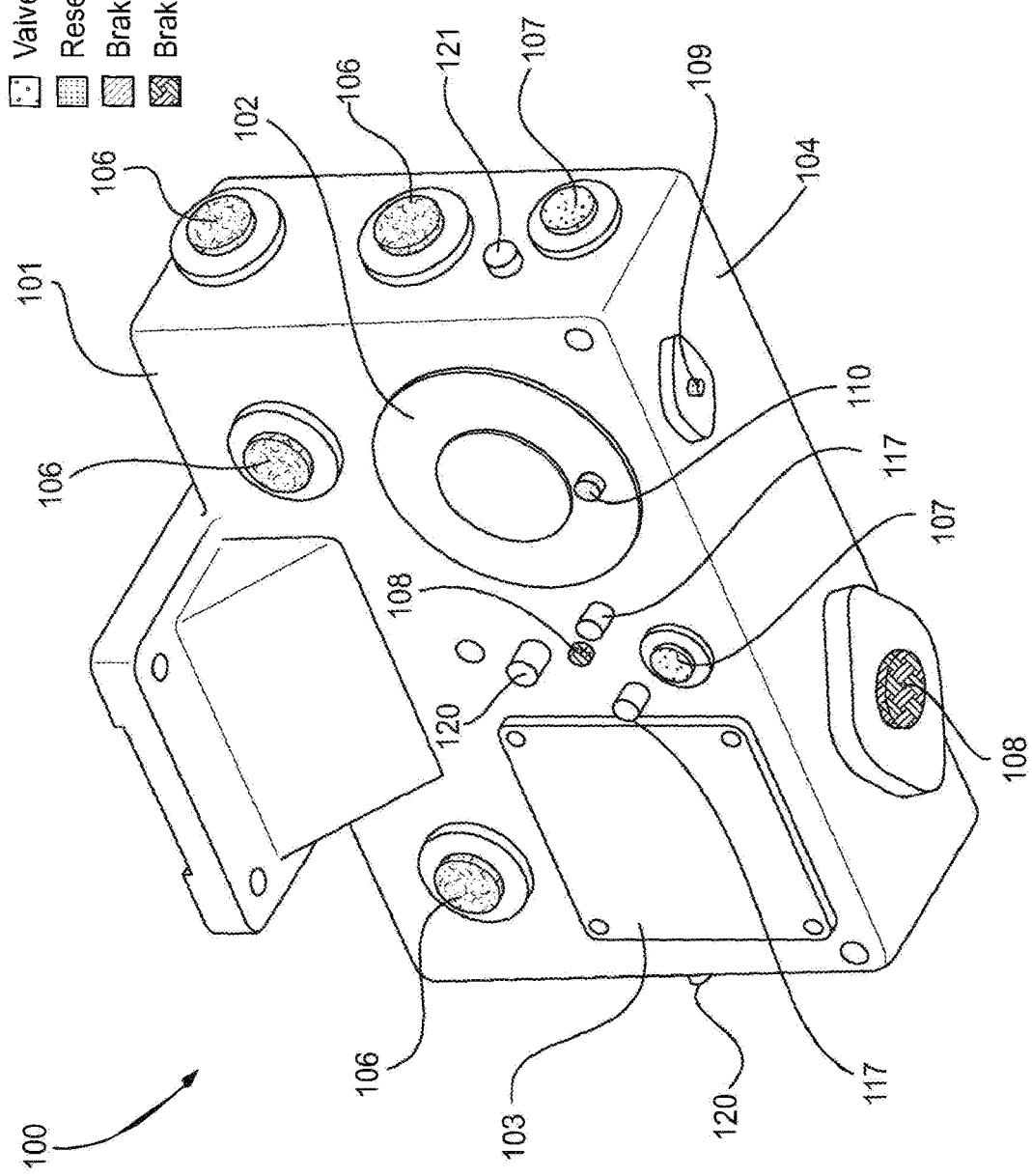
FIG. 9 depicts a perspective view of the distributor valve pipe bracket of FIG. 6 illustrating the passages.

As shown in FIG. 9, the working chamber passage 106, the valve chamber passage 107, the brake pipe signal passage 117, and the ADC passage 120 place the main portion 12 in communication with the main line portion 13. The brake cylinder exhaust passage 121 places the main portion 12 in communication with the pipe bracket 11. The brake pipe passage 108 places the main portion 12 and the main line portion 13 in communication with the brake pipe 14. The reservoir passage 109 places the main portion 12 in communication with the reservoir 16. The brake cylinder passage 110 places the main portion 12 and the main line portion 13 in communication with the brake cylinder 15.

Figure 8:
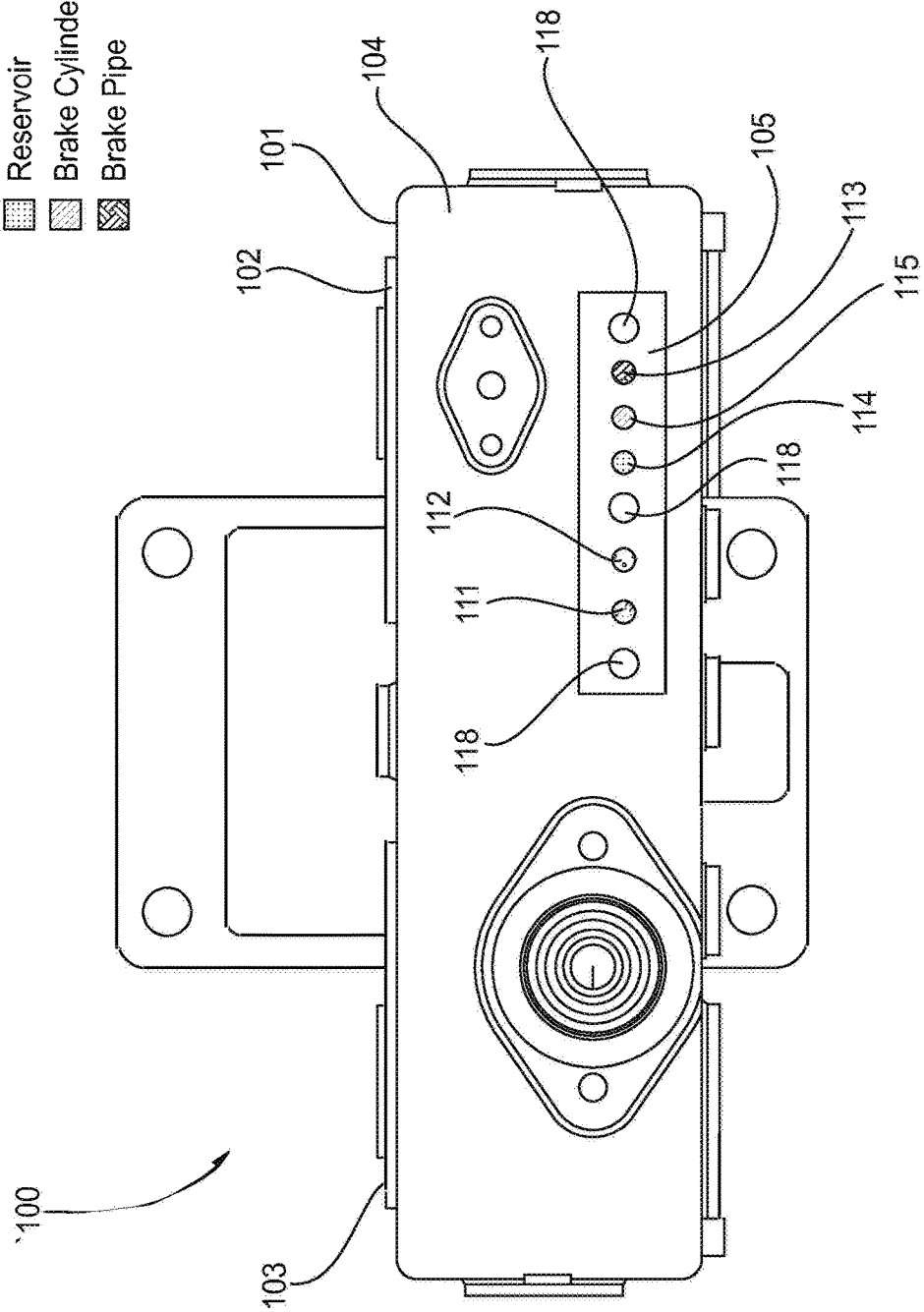
FIG. 8 depicts a bottom view of the distributor valve pipe bracket of FIG. 6.
Figure 10:
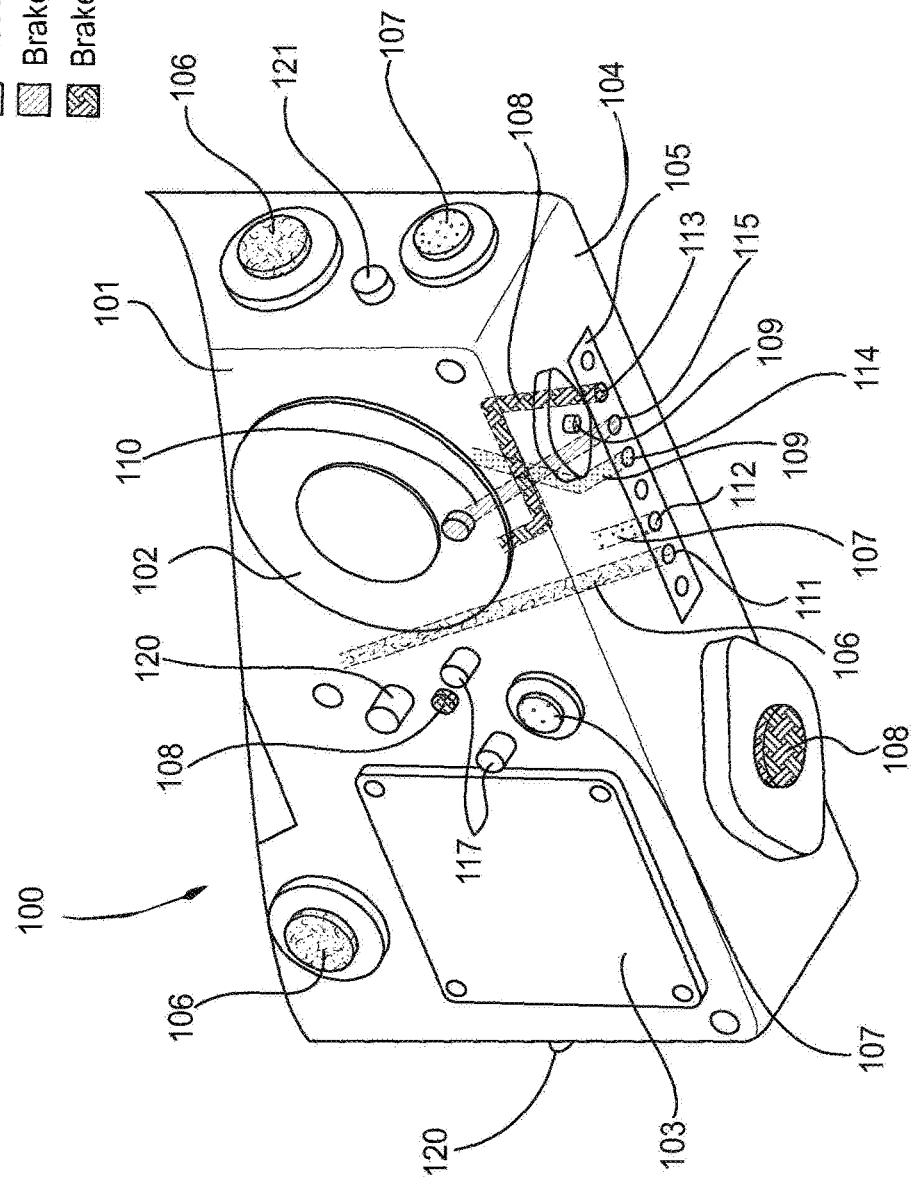
FIG. 10 depicts another perspective view of the distributor valve pipe bracket of FIG. 6 illustrating the communication between the integral port interface and the internal passages of the pipe bracket.

As shown in FIGS. 8 and 10, the pipe bracket 100 additionally includes the integral port interface 105 formed on the second or bottom side 104 of the pipe bracket 100 adjacent to the interface 102 for mounting the main portion 12 to the pipe bracket 100. The positioning of the integral portion interface 105 may be changed to a different side or location of the pipe bracket 100. The integral port interface 105 includes a plurality of access ports 111, 112, 113, 114, 115 arranged therein. In particular, the integral port interface 105 includes an access port 111 connected to the working chamber passage 106, an access port 112 connected to the valve chamber passage 107, an access port 113 connected to the brake pipe passage 108, an access port 114 connected to the reservoir passage 109, and an access port 115 connected to the brake cylinder passage 110. FIG. 10 shows, according to one example of the inventive subject matter, that the pipe bracket 100 may include short tubes integrally formed or assembled therein for communicating the passages 106, 107, 108, 109, 110 of the pipe bracket 100 with the corresponding access ports 111, 112, 113, 114, 115. The pipe bracket 100 may be constructed to provide the integral port interface 105 in communication with the passages 106, 107, 108, 109, 110 of the pipe bracket 100. The pipe bracket 100 may be formed from a variety of materials, such as one or more metals, particularly iron, castings with the passages 106, 107, 108, 109, 110 integrally formed therein.

With reference to FIGS. 10 and 11, the integral access interface 105 of the pipe bracket 100 is configured to be engaged by a testing device 150 that measures the operational pressures of the plurality of passages 106, 107, 108, 109, 110 of the pipe bracket 100 via the access ports 111, 112, 113, 114, 115 of the integral access interface 105. The testing device 150 may be an automated single car test device that can manipulate multiple (e.g., all five) required pneumatic pressures available in the braking system. The testing device 150 includes a fitting 151 and an adapter 152 configured to engage the integral access interface 105 of the pipe bracket 100 to place the access ports 111, 112, 113, 114, 115 in pneumatic communication with the sensing apparatus of the testing device 150. The integral access interface 105 may include mounting holes 118 defined therein for establishing a connection between the fitting 151 and the side 104 of the pipe bracket 100. When the operational pressures of the distributor valve 10 are not being tested, a cover plate (not shown) or similar closure may be connected to the integral access interface 105 of the pipe bracket 100 to seal the access ports 111, 112, 113, 114, 115 closed.

With reference to FIGS. 1-11, a method for accessing operation pressures in a distributor valve 10 of a brake control system is provided. The distributor valve 10 is connected to a brake pipe 14, a brake cylinder 15, and a reservoir 16 of the brake control system. The distributor valve 10 includes a pipe bracket 11, 100, a main portion 12 mounted on the pipe bracket 11, 100, and a main line portion 13 mounted on the pipe bracket 11, 100. The pipe bracket 11, 100 includes a plurality of passages 17, 18, 19, 20, 21, 27, 28, 106, 107, 108, 109, 110, 117, 120, 121 defined therein and extending through the pipe bracket 11, 100. The plurality of passages 17, 18, 19, 20, 21, 27, 28, 106, 107, 108, 109, 110, 117, 120, 121 is configured to place the main portion 12 and the main line portion 13 in communication with each other and with the brake pipe 14, the brake cylinder 15, and the reservoir 16. The plurality of passages 17, 18, 19, 20, 21, 27, 28, 106, 107, 108, 109, 110, 117, 120, 121 includes a working chamber passage 17, 106 configured to place the main portion 12 in communication with the main line portion 13, a valve chamber passage 18, 107 configured to place the main portion 12 in communication with the main line portion 13, a brake pipe passage 19, 108 configured to place the main portion 12 and the main line portion 13 in communication with the brake pipe 14, a reservoir passage 20, 109 configured to place the main portion 12 in communication with the reservoir 16, a brake cylinder passage 21, 110 configured to place the main portion 12 and the main line portion 13 in communication with the brake cylinder 15, and an ADC passage 27, 120 configured to place the main portion 12 and the main line portion 13 in communication with each other. The pipe bracket 11, 100 may also have a brake pipe signal passage 117 configured to place the main portion 12 and the main line portion 13 in communication with each other.

The method includes providing an access interface 51, 105 comprising a plurality of access ports 53, 54, 55, 56, 57, 111, 112, 113, 114, 115 on the pipe bracket 11, 100. The plurality of access ports includes an access port 53, 111 connected to the working chamber passage 17, 106, an access port 54, 112 connected to the valve chamber passage 18, 107, an access port 55, 113 connected to the brake pipe passage 19, 108, an access port 56, 114 connected to the reservoir passage 20, 109, and an access port 57, 115 connected to the brake cylinder passage 21, 110.

The method may further include engaging the access interface 51, 105 with a testing device 150 for measuring the operational pressures of the plurality of passages 17, 18, 19, 20, 21, 106, 107, 108, 109, 110 via the plurality of access ports 53, 54, 55, 56, 57, 111, 112, 113, 114, 115.

In one example, a distributor valve for a brake control system of a vehicle is provided. The distributor valve is connected to a brake pipe, a brake cylinder, and a reservoir of the brake control system. The distributor valve includes a pipe bracket, a main portion mounted on the pipe bracket, and a main line portion mounted on the pipe bracket. The pipe bracket comprises a plurality of passages defined therein and extending through the pipe bracket. The passages are configured to place the main portion and the main line portion in communication with each other and with the brake pipe, the brake cylinder, and the reservoir. The passages include a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other. The distributor valve further includes an access interface comprising a plurality of access ports. The access ports include an access port connected to the working chamber passage, an access port connected to the valve chamber passage, an access port connected to the brake pipe passage, an access port connected to the reservoir passage, and an access port connected to the brake cylinder passage.

Optionally, the access interface comprises an integral port interface disposed on a side of the pipe bracket. The access ports can be arranged within the integral port interface.

Optionally, the integral port interface can be configured to be engaged by a testing device for measuring operational pressures of the passages in the pipe bracket via the plurality of access ports. The main portion and the main line portion can be mounted spaced apart on a side of the pipe bracket and the integral port interface can be disposed in a different side of the pipe bracket adjacent to the main portion.

The access interface can include a pressure access plate disposed between the pipe bracket and the main portion. The access ports can be arranged in a face of the pressure access plate.

Optionally, the pressure access plate includes internally segregated chambers that provide for communication between the main portion, the pipe bracket, and the access ports in the face of the pressure access plate.

Optionally, each of the internally segregated chambers includes openings for communicating with a corresponding passage in the main portion and a corresponding one of the passages in the pipe bracket.

Optionally, the face of the pressure access plate is configured to be engaged by a testing device for measuring operational pressures of the passages in the pipe bracket via the plurality of access ports.

In another example, a pipe bracket for a distributor valve in a vehicle brake control system is provided. The pipe bracket is connected to a brake pipe, a brake cylinder, and a reservoir of the brake control system. The pipe bracket is configured to have a main portion and a main line portion of the distributor valve mounted thereon. The pipe bracket includes a plurality of passages defined in the pipe bracket and extending through the pipe bracket. The passages are configured to place the main portion and the main line portion of the distributor valve in communication with each other and with the brake pipe, the brake cylinder, and the reservoir. The passages include a working chamber passage configured to place the main portion in communication with the main line portion, a valve chamber passage configured to place the main portion in communication with the main line portion, a brake pipe passage configured to place the main portion and the main line portion in communication with the brake pipe, a reservoir passage configured to place the main portion in communication with the reservoir, a brake cylinder passage configured to place the main portion and the main line portion in communication with the brake cylinder, and at least one additional passage configured to place the main portion and the main line portion in communication with each other. The pipe bracket also includes an integral port interface disposed on a side of the pipe bracket. The integral port interface includes access ports arranged therein. The access ports include an access port connected to the working chamber passage, an access port connected to the valve chamber passage, an access port connected to the brake pipe passage, an access port connected to the reservoir passage, and an access port connected to the brake cylinder passage.

Optionally, the integral port interface is configured to be engaged by a testing device for measuring operational pressures of the passages in the pipe bracket via the access ports.

Optionally, the pipe bracket is configured to have the main portion and the main line portion mounted thereon spaced apart on a side of the pipe bracket. The integral port interface is disposed on a different side of the pipe bracket adjacent to a mounting location for the main portion.

In another example, a pressure access plate is provided that gives access to operational pressures in a distributor valve of a brake control system. The distributor valve comprises a pipe bracket, a main portion mounted on the pipe bracket, and a main line portion mounted on the pipe bracket. The distributor valve is connected to a brake pipe, a brake cylinder, and a reservoir of the brake control system. The pressure access plate is configured to be mounted between the pipe bracket and the main portion of the distributor valve. The pressure access plate includes a face having a plurality of access ports arranged therein. The access plate also includes a body having a plurality of internally segregated chambers defined therein. Each of the internally segregated chambers can be in communication with a corresponding access port in the face. Each of the chambers can include at least one opening configured to place the chamber in communication with a corresponding passage of the main portion and at least one opening configured to place the chamber in communication with a corresponding passage of the pipe bracket. The plurality of internally segregated chambers comprises a first chamber configured to communicate a working chamber passage in the pipe bracket with a working chamber access port in the face and a first passage in the main portion, a second chamber configured to communicate a valve chamber passage in the pipe bracket with a valve chamber access port in the face and a second passage in the main portion, a third chamber configured to communicate a brake pipe passage in the pipe bracket with a brake pipe access port in the face and a third passage in the main portion, a fourth chamber configured to communicate a reservoir passage in the pipe bracket with a reservoir access port in the face and a fourth passage in the main portion, and a fifth chamber configured to communicate a brake cylinder passage in the pipe bracket with a brake cylinder access port in the face and a fifth passage in the main portion.

Optionally, the face of the pressure access plate can be configured to be engaged by a testing device for measuring operational pressures of the passages in the pipe bracket via the access ports.

In another example, a method for accessing operational pressures in a distributor valve of a brake control system is provided. The method includes providing an access interface comprising access ports on a pipe bracket. The access ports include an access port connected to a working chamber passage, an access port connected to a valve chamber passage, an access port connected to a brake pipe passage, an access port connected to a reservoir passage, and an access port connected to a brake cylinder passage.

The access interface can include an integral port interface disposed on a side of the pipe bracket. The access ports can be arranged within the integral port interface.

The method also can include engaging the integral port interface with a testing device for measuring the operational pressures of the passages in the pipe bracket via the access ports.

Optionally, the main portion and the main line portion can be mounted spaced apart on a side of the pipe bracket and the integral port interface can be disposed in a different side of the pipe bracket adjacent to the main portion.

The method also can include providing a pressure access plate disposed between the pipe bracket and the main portion as the access interface. The access ports can be arranged in a face of the pressure access plate.

Optionally, the pressure access plate can include internally segregated chambers that provide for communication between the main portion, the pipe bracket, and the access ports in the face of the pressure access plate.

Optionally, each of the internally segregated chambers comprises openings for communicating with a corresponding passage in the main portion and a corresponding one of the passages in the pipe bracket.

The method also can include engaging the face of the pressure access plate with a testing device for measuring the operational pressures of the passages in the pipe bracket via the access ports.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A distributor valve assembly of a vehicle brake control system, the distributor valve assembly comprising:
a pipe bracket having passages extending through the pipe bracket, the passages positioned to place a main portion of a distributor valve and a main line portion of the distributor valve in communication with each other and with a brake pipe of the vehicle brake control system, a brake cylinder of the vehicle brake control system, and a reservoir of the vehicle brake control system; and
an integral port interface disposed on a side of the pipe bracket, the integral port interface comprising access ports arranged therein and separately connected to the passages, wherein the integral port interface comprises internally segregated chambers that provide for communication between the main portion, the pipe bracket, and the access ports in the access interface and the internally segregated chambers include openings for communicating with passages in the main portion and passages in the pipe bracket.

2. The distributor valve assembly of claim 1, wherein the passages in the pipe bracket include a working chamber passage and a valve chamber passage each configured to place the main portion and the main line portion of the distributor valve in communication with each other.

3. The distributor valve assembly of claim 2, wherein the passages in the pipe bracket include a brake pipe passage configured to place the main portion and the main line portion in communication with the brake pipe, a reservoir passage configured to place the main portion in communication with the reservoir, and a brake cylinder passage configured to place the main portion and the main line portion in communication with the brake cylinder.

4. The distributor valve assembly of claim 1, wherein the integral port interface is configured to be engaged by a testing device for measuring operational pressures of the passages in the pipe bracket via the access ports.

5. The distributor valve assembly of claim 1, wherein the pipe bracket is configured to have the main portion and the main line portion mounted thereon and spaced apart on a side of the pipe bracket, and the integral port interface is disposed on a different side of the pipe bracket adjacent to a mounting location for the main portion.

6. A method comprising:
providing an access interface comprising access ports on a pipe bracket of a distributor valve of a vehicle brake control system, the access ports comprising a first access port connected to a working chamber passage of the pipe bracket, a second access port connected to a valve chamber passage of the pipe bracket, a third access port connected to a brake pipe passage of the pipe bracket, a fourth access port connected to the pipe bracket, and a fifth access port connected to the pipe bracket, wherein the access interface comprises internally segregated chambers that provide for communication between a main portion of the distributor valve, the pipe bracket, and the access ports in the access interface and the internally segregated chambers include openings for communicating with passages in the main portion and passages in the pipe bracket.

7. The method of claim 6, wherein the access interface comprises an integral port interface disposed on a side of the pipe bracket, wherein the access ports are arranged within the integral port interface.

8. The method of claim 7, further comprising:
engaging the integral port interface with a testing device for measuring operational pressures of the passages in the pipe bracket via the access ports.

9. The method of claim 6, further comprising:
providing a pressure access plate disposed between the pipe bracket and the main portion as the access interface, wherein the access ports are arranged in a face of the pressure access plate.

10. The method of claim 9, further comprising:
engaging the face of the pressure access plate with a testing device for measuring operational pressures of the passages in the pipe bracket via the access ports.

11. A distributor valve comprising:
a pipe bracket having passages defined therein that extend through the pipe bracket;
a main portion mounted on the pipe bracket;
a main line portion mounted on the pipe bracket, the passages of the pipe bracket configured to place the main portion and the main line portion in communication with each other and with a brake pipe of a brake control system, a brake cylinder of the brake control system, and a reservoir of the brake control system; and
an access interface comprising an integral port interface having access ports that are connected with the passages of the pipe bracket, the integral port interface configured to be engaged by a testing device for measuring operational pressures of the passages in the pipe bracket via the access ports, wherein the access interface comprises internally segregated chambers that provide for communication between the main portion, the pipe bracket, and the access ports in the access interface and the internally segregated chambers include openings for communicating with passages in the main portion and passages in the pipe bracket.

12. The distributor valve of claim 11, wherein the passages in the pipe bracket include a working chamber passage and a valve chamber passage each configured to place the main portion in communication with the main line portion.

13. The distributor valve of claim 12, wherein the passages in the pipe bracket also include a brake pipe passage configured to place the main portion and the main line portion in communication with the brake pipe, a reservoir passage configured to place the main portion in communication with the reservoir, and a brake cylinder passage configured to place the main portion and the main line portion in communication with the brake cylinder.

14. The distributor valve of claim 11, wherein the main portion and the main line portion are configured to be spaced apart from each other on a side of the pipe bracket and the integral port interface is configured to be disposed on a different side of the pipe bracket.

15. The distributor valve of claim 11, wherein the access interface comprises a pressure access plate disposed between the pipe bracket and the main portion.

16. The distributor valve of claim 11, wherein the distributor valve is disposed in a brake system of a vehicle, the brake system including the brake control system.

17. The distributor valve of claim 16, wherein the vehicle is a railway vehicle.

18. A railway vehicle comprising: the distributor valve of claim 11; and a chassis, wherein the brake control system is attached to the chassis and the distributor valve is coupled with the brake control system.

\* \* \* \* \*